(12) United States Patent
Kroeger

(10) Patent No.: US 12,115,672 B2
(45) Date of Patent: Oct. 15, 2024

(54) ROBOT PLANNING

(71) Applicant: Intrinsic Innovation LLC, Mountain View, CA (US)

(72) Inventor: Torsten Kroeger, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 58 days.

(21) Appl. No.: 17/131,240

(22) Filed: Dec. 22, 2020

(65) Prior Publication Data
US 2022/0193907 A1  Jun. 23, 2022

(51) Int. Cl.
*B25J 9/16* (2006.01)
*B25J 13/08* (2006.01)

(52) U.S. Cl.
CPC ............. *B25J 9/1666* (2013.01); *B25J 9/163* (2013.01); *B25J 13/089* (2013.01)

(58) Field of Classification Search
CPC ........ B25J 9/1666; B25J 9/163; B25J 13/089; B25J 9/1676; G05B 2219/39244; G05B 2219/40425; G05B 2219/40426; G05B 2219/40476; G05B 2219/40516; G05B 2219/40521; G05B 2219/49137
See application file for complete search history.

(56) References Cited

U.S. PATENT DOCUMENTS

| | | | |
|---|---|---|---|
| 8,700,307 B1 | 4/2014 | Zhao et al. | |
| 9,689,696 B1* | 6/2017 | Russell | .............. G05D 1/0287 |
| 10,035,264 B1 | 7/2018 | Kalakrishnan et al. | |
| 10,035,266 B1 | 7/2018 | Kroeger | |
| 2012/0215351 A1* | 8/2012 | McGee | ................. B25J 9/1676 |
| | | | 700/248 |

(Continued)

FOREIGN PATENT DOCUMENTS

| | | |
|---|---|---|
| EP | 1090723 | 4/2001 |
| WO | WO 2017/197170 | 11/2017 |

OTHER PUBLICATIONS

Flacco et al., "A depth space approach to human-robot collision avoidance," 2012 IEEE International Conference on Robotics and Automation, May 2012, 8 pages.

(Continued)

*Primary Examiner* — Jason Holloway
*Assistant Examiner* — Blake A Wood
(74) *Attorney, Agent, or Firm* — Fish & Richardson P.C.

(57) ABSTRACT

Methods, systems, and apparatus, including computer programs encoded on computer storage media, for controlling robotic movements. One of the methods includes receiving, for a robot, an initial plan specifying a path and a local trajectory; receiving an updated observation of an environment of the robot; generating an initial modified local trajectory for the robot based on the updated observation in the environment of the robot; repeatedly following the initial modified local trajectory for the robot while generating a modified global path for the robot, comprising: obtaining data representing a workspace footprint for the robot, the workspace footprint defining a volume for a workspace of the robot, and generating the modified global path to avoid causing the robot to cross a boundary of the volume defined by the workspace footprint; and causing the robot to follow the modified global path for the robot.

20 Claims, 10 Drawing Sheets

(56) References Cited

U.S. PATENT DOCUMENTS

| | | | |
|---|---|---|---|
| 2015/0277398 A1* | 10/2015 | Madvil | B25J 9/1671 |
| | | | 901/3 |
| 2017/0028556 A1* | 2/2017 | Summer | B25J 9/1664 |
| 2017/0348856 A1* | 12/2017 | Nakaya | B25J 9/1666 |
| 2017/0364076 A1* | 12/2017 | Keshmiri | G05B 19/0426 |
| 2019/0184561 A1* | 6/2019 | Yip | G06N 3/044 |
| 2019/0337154 A1 | 11/2019 | Holson | |
| 2020/0086486 A1 | 3/2020 | Graichen et al. | |
| 2020/0139545 A1* | 5/2020 | Hayashi | B25J 9/1664 |
| 2021/0053227 A1* | 2/2021 | Wartenberg | B25J 9/163 |
| 2021/0197378 A1* | 7/2021 | Schönherr | B25J 9/1666 |

OTHER PUBLICATIONS

International Search Report and Written Opinion in International Appln. No. PCT/US2021/054408, dated Jan. 28, 2022, 20 pages.
International Preliminary Report on Patentability in International Appln. No. PCT/US2021/054408, dated Jul. 6, 2023, 14 pages.

* cited by examiner

ROBOT PLANNING

BACKGROUND

This specification relates to robotics, and more particularly to controlling robotic movements.

Robotics planning refers to scheduling the physical movements of robots in order to perform skills. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular skill. Manual programming is tedious, time-consuming, and error prone. In addition, a schedule that is manually generated for one workcell can generally not be used for other workcells. In this specification, a workcell is the physical environment in which a robot will operate. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

In addition, while some skills performed by the robot can be planned offline, certain motions are determined based on sensor measurements received in real-time during performance of the skill by the robot. Therefore, robot movements required to perform sensor-based skills must be planned in real-time (or near real-time) during execution of the skill, and thus cannot be scheduled in advanced through offline planning. However, current online, real-time planning systems fail to account for the physical constraints of the workcell, such as the physical dimensions and the movements of other robots within the workcell.

SUMMARY

This specification describes how a system can generate and modify motion plans in real-time based on data received from one or more sensors. For example, an online execution system can receive an initial motion plan that specifies a path for a robot to follow within a workcell in order to complete one or more skills. As the robot begins to execute the initial motion plan, one or more sensors within the workcell can provide updated data regarding the robot and/or the workcell. In response to receiving the senor data, an online execution engine of the system can generate, in real-time, an initial modified local trajectory for the robot based on the data provided by the sensor(s). In addition, while the robot is controlled by the system to follow the initial modified local trajectory, the system can simultaneously generate a modified global path for the robot to follow that is optimized based on the sensor data. In some examples, the initial modified local trajectory and modified global path are generated based in part of the maximum acceleration capacity of the robot. Each of the initial modified local trajectory and the modified global path are generated to constrain the robot's movements a predefined volume within the workcell ("workspace footprint") in order to avoid interference with other objects or robots within the workcell.

In addition, the system can generate a motion plan for a robot that defines paths for the robot to follow between of sensor-based interaction to be performed by the robot. For example, the system can generate a path between an entry point of a sensor-based skill to the start of a sensor-based interaction of the skill. In addition, the system can generate a path between the end of the sensor-based interaction of the sensor-based skill and an exit point of the sensor-based skill. The paths generated by the system are contained within a predefined workspace footprint to constrain the motion of the robot based on a specified volume within the workcell. In some examples, the system can modified and optimize the paths between sensor-based skills based on feedback provided by one or more sensors within the workcell.

Particular embodiments of the subject matter described in this specification can be implemented so as to realize one or more of the following advantages. Using real-time sensor data to generate modified trajectories and modified global paths for a robot that are constrained to a specified workspace footprint allows for real-time optimization of sensor-based skills while avoiding collision of the robot with other physical objects within the workcell. In addition, by constraining the updated trajectories and motion paths generated based on sensor observations to a particular workspace footprint, multiple robots can perform sensor-based skills within a workcell with reduced risk of interference or collision between the robots. By constraining the updated trajectories and paths generated based on sensor observations to a predefined workspace footprint, a human can work safely within the workcell outside of the space corresponding to the workspace footprint while the robot performs the sensor-based skills.

By generating a motion plan that defines paths between a sensor-based interaction of a skill and the entry and exit points of the skill, a motion path for performance of sensor-based skill can be generated in advance by an offline planner, thus reducing the planning required to be performed in real-time. In addition, by enabling the offline planner to generate a motion plan for sensor-based skills, the offline planner can coordinate the movements of multiple robots performing sensor-based skills within a workcell. An online planner of the system can also update the paths of the motion plan generated by the offline planner in response to observations provided by one or more sensors in the workcell, which allows for optimization of the performance of the sensor-based skills by the robot. In addition, as discussed above, by constraining the updated paths to a predetermined workspace footprint, the motion plan for the robot can be updated in real-time while avoiding collision of the robot with other physical objects within the workcell. Therefore, constraining the updated paths for the sensors-based skills to a particular workspace footprint(s) enables human-robot collaboration and multi-robot collaboration.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
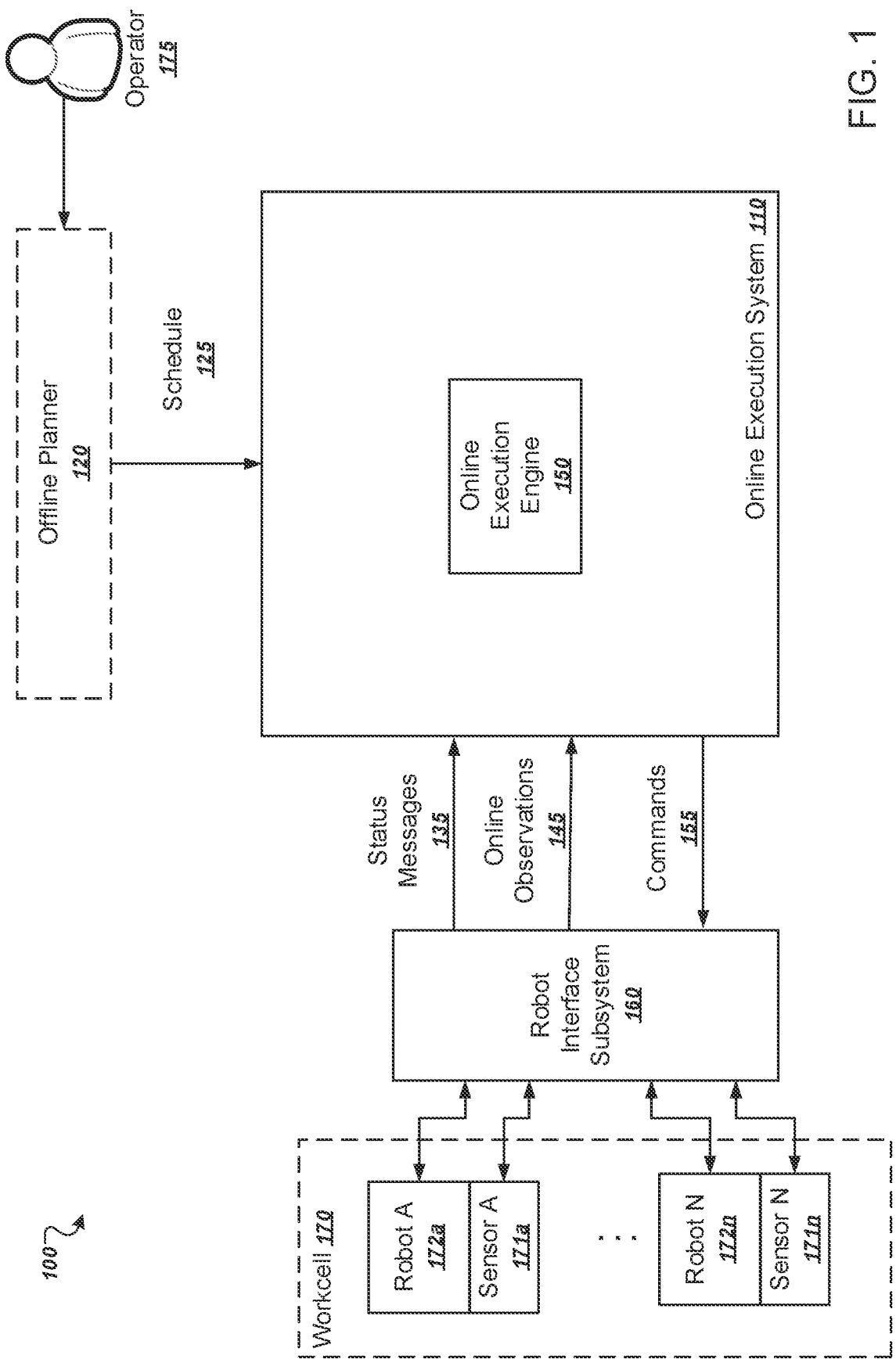
FIG. 1 is a diagram that illustrates an example system.

FIG. 1 is a diagram that illustrates an example system 100. The system 100 is an example of a system that can implement the online robotic control techniques described in this specification.

The system 100 includes a number of functional components, including an online execution system 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 110 provides commands 155 to be executed by the robot interface subsystem 160, which drives one or more robots, e.g., robots 172a-n, in a workcell 170. In order to compute the commands 155, the online execution system 110 consumes status messages 135 generated by the robots 172a-n and online observations 145 made by one or more sensors 171a-n making observations within the workcell 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the workcell 170. Any suitable sensors 171 can be used, such as distance sensors, force sensors, torque sensors, cameras, etc.

The robot interface subsystem 160 and the online execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command every 5 milliseconds, while the online requirements of the online execution system 110 specify that the online execution system 110 should provide a command 155 to the robot interface subsystem 160 every 20 milliseconds. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

The system 100 can also optionally include an offline planner 120. The overall goal of the offline planner 120 is to generate, from a definition of one or more skills to be performed, a schedule that will be executed by the robots 172a-n to accomplish the skills. In this specification, a schedule is data that assigns each skill to at least one robot. A schedule also specifies, for each robot, a sequence of actions to be performed by the robot. A schedule also includes dependency information, which specifies which actions must not commence until another action is finished. A schedule can specify start times for actions, end times for actions, or both.

The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 170. On the other hand, the online execution engine 150 is typically local to the facility that houses the workcell 170.

This arrangement thus provides three different computing zones. The offline planner 120 can use massive cloud-based computing resources to consider many possibilities for scheduling skills, while also allowing for online reaction to unanticipated events by the online execution engine 150, while also providing the precision and real-time safety mechanisms of the robot interface subsystem 160.

Thus, in operation, the online execution system 110 obtains a workcell-specific schedule 125 and issues commands 155 to the robot interface system 160 in order to actually drive the movements of the moveable components, e.g., the joints, of the robots 172a-n. In some implementations, the robot interface subsystem 160 provides a hardware-agnostic interface so that the commands 155 issued by online execution engine 150 are compatible with multiple different versions of robots. During execution the robot interface subsystem 160 can report status messages 135 back to the online execution system 110 so that the online execution engine 150 can make online adjustments to the robot movements, e.g., due to local faults or other unanticipated conditions.

In execution, the robots 172a-n generally continually execute the commands specified explicitly or implicitly by the motion plans to perform the various skills or transitions of the schedule. The robots can be real-time robots, which means that the robots are programmed to continually execute their commands according to a highly constrained timeline. For example, each robot can expect a command from the robot interface subsystem 160 at a particular frequency, e.g., 100 Hz or 1 kHz. If the robot does not receive a command that is expected, the robot can enter a fault mode and stop operating.

The offline planner 120 can also define a volume within the workcell ("workspace footprint") for each skill to be performed by the robot 172. The offline planner 120 can then generate a motion plan for the robot 172 that defines the movements of the robot 172 to perform a particular skill, and constraint the movements of the robot 172 within the workspace footprint defined for the particular skill. By planning the movements of the robot to be constrained within a defined workspace footprint, interference with other objects or robots within the workcell 170 can be avoided.

In some implementations, the offline planner 120 provides the workspace footprint(s) to the online execution system 110, and the online execution system uses the workspace footprints to update the motion plan for the robot 172 in real-time. For example, the online execution system 110 can include an online execution engine 150 that generates updated motion paths for a robot 172 based on sensor feedback received by the online execution system 110. By providing the online execution system 110 with the workspace footprint for each skill to be performed by the robot 172, the online execution engine 150 can generate an updated motion path for the robot 172 to complete a particular skill in real-time that is based on sensor feedback and is contained within the workspace footprint for the skill. By constraining the updated motion path for the particular skill to the predefined workspace footprint, the online execution engine 150 can generate an updated motion plan that avoids interference with other objects or robots within the workcell 170.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, gluing tools, cutting tools, and sanding devices.

In this specification, a skill is a sequence of one or more tasks to be performed by the robot, with each task being performed by a particular tool of the robot. For brevity, when a robot has only one tool, a task can be described as an operation to be performed by the robot as a whole. Example tasks that can be included in a skill include welding, glue dispensing, part positioning, and surfacing sanding, to name just a few examples. Skills are generally associated with a type that indicates the tool required to perform the series of tasks in the skill, as well as a position within a workcell at which the series of tasks in the skill will be performed.

In this specification, a motion plan is a data structure that provides information for executing an action, which can be a skill, a cluster of skills, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a skill graph between two configuration states for a single robot. Thus, generally there is one skill graph per robot.

In this specification, a motion swept volume is a region of the space that is occupied by a least a portion of a robot or tool during the entire execution of a motion plan. The motion swept volume can be generated by collision geometry associated with the robot-tool system.

In this specification, a transition is a motion plan that describes a movement to be performed between a start point and an end point. The start point and end point can be represented by poses, locations in a coordinate system, or skills to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

Figure 2:
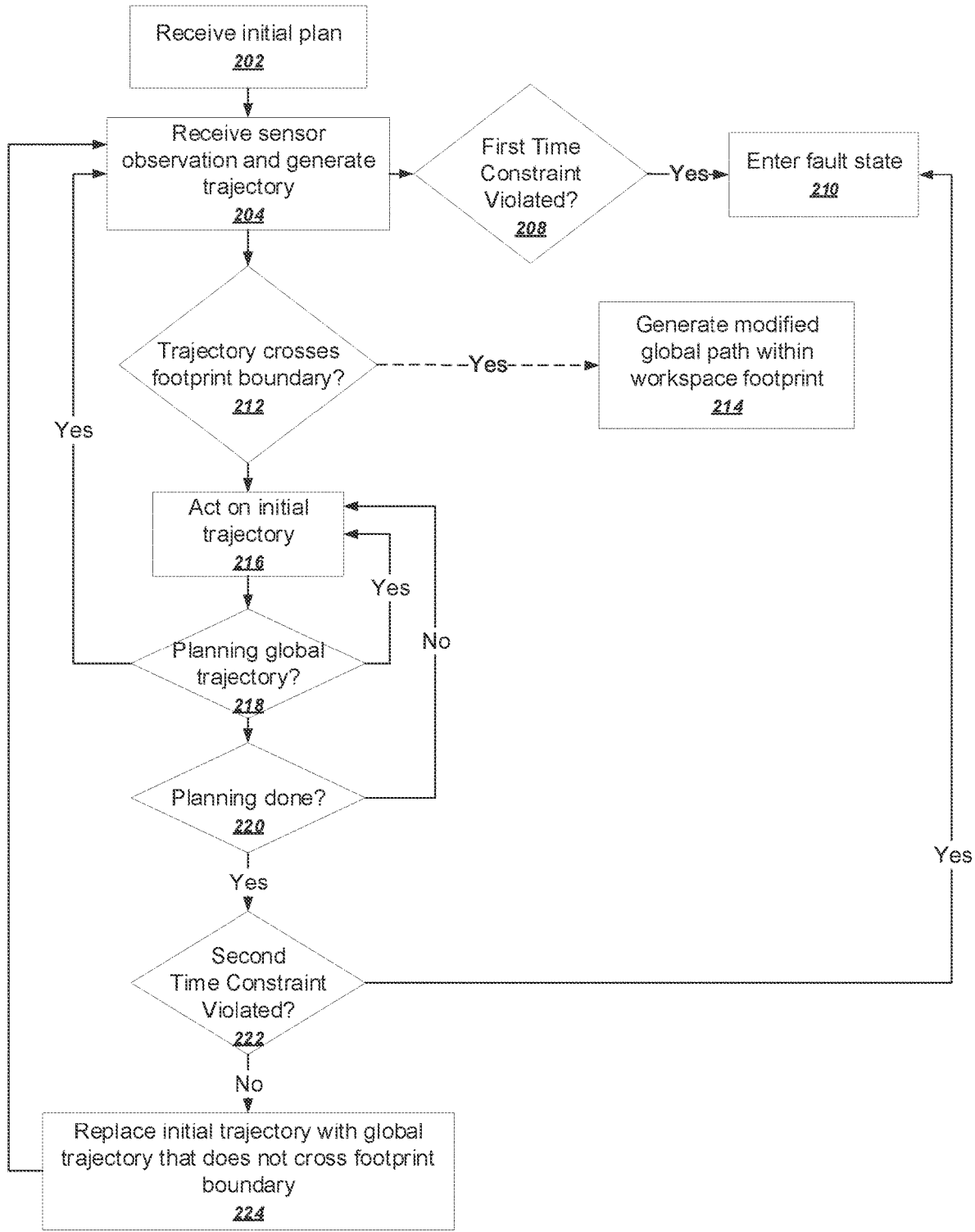
FIG. 2 is a flowchart of an example process for optimizing a motion path of a robot within a workspace footprint.

FIG. 2 is a flowchart of an example process 200 for generating and executing motion plans for a robot (e.g., robot 172 of FIG. 1) using the online execution system 110 of FIG. 1.

As depicted in FIG. 2, the online execution system 110 receives an initial motion plan (202). As previously discussed, a motion plan is a data structure that provides information for executing an action. In some implementations, the initial motion plan received by the online execution system 110 is generated by and received from the offline planner 120 of the system 100. For example, prior to a robot's 172 execution of a particular series of skills, the offline planner 120 can generate a motion plan for the robot 172 that provides a path for the robot 172 to follow in order to complete one or more skills. In some implementations, the initial motion plan received by the online execution system 110 is underconstrained. For example, the initial motion plan can include one of more skills that require feedback from one or more sensors in the workcell in order to determine the movements necessary to complete the respective skills.

Figure 3:
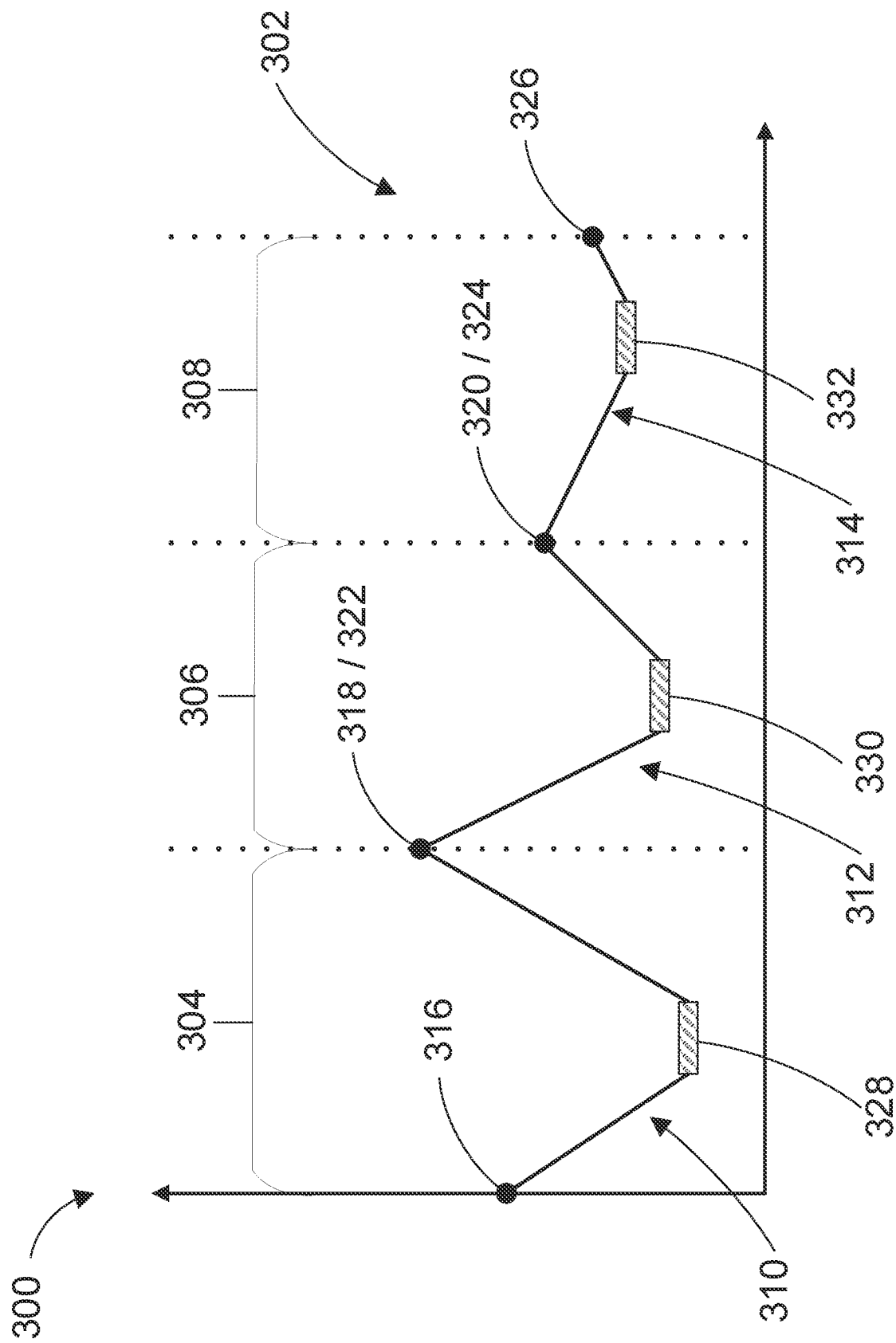
FIG. 3 illustrates an example initial motion plan for a robot.

FIG. 3 depicts an example initial motion plan 300 received by the online execution system 110. The motion plan 300 represents the movement of the robot 172 over time with time being depicted on the x-axis of the motion plan 300 and the movement of the robot 172 in a single dimension being depicted on the y-axis of the motion plan 300. As depicted in FIG. 3, the initial motion plan 300 defines a path 302 for a robot 172 to follow to perform a series of skills 304, 306, 308. As depicted in FIG. 3, each of the skills 304, 306, 308 includes an entry point 316, 318, 320, respectively, and an exit point 322, 324, 326, respectively. In some implementations, the exit point for a particular skill may also serve as the entry point for a subsequent skill in the motion plan. For example, the exit point 322 of the first skill 304 in the motion plan 300 is also the entry point 318 for the second skill 306 in the motion plan 300.

As depicted in FIG. 3, the path 302 of the initial motion plan 300 defines a series of transitions 310, 312, 314 between entry points 316, 320, 324 and exits points 318, 322, 326 of each skill 304, 306, 308. In some implementations, the transitions 310, 312, 314 included in the initial motion plan 300 are underconstrained. As previously discussed, an underconstrained motion plan includes one or more values for controllable degrees of freedom that are undefined. For example, as depicted in FIG. 3, each skill 304, 306, 308 in the initial motion plan 300 received by the online execution system 110 includes a sensor-based interaction 328, 330, 332 that must be performed by the robot 172 executing the motion plan 300. Examples of sensor-based interactions 328, 330, 332 can include welding, glue dispensing, part positioning, and surfacing sanding. The specific movements and path that the robot 172 must take in order to complete each of the sensor-based interactions 328, 330, 332 are dependent on feedback received in real-time from the sensors 171a-171n in the workcell 170. Since each of the skills 304, 306, 308 includes a sensor-based interaction 328, 330, 332, the initial motion plan 300 is not fully constrained, as the movements necessary to complete each of the sensor-based interactions 328, 330, 332 cannot be determined until the robot 172 begins to execute the respective interaction. In addition, since the specific motions of the robot 172 required to perform the sensor-based interactions 328, 330, 332 are determined in real-time based on feedback provided by the sensor(s) 171 in the workcell 170, the path 302 in the initial motion plan 302 cannot be fully constrained through offline planning.

For example, the skills 304, 306, 308 in the initial motion plan 300 can each represent a weld skill to be performed in sequence by the robot 172, with the sensor-based interactions 328, 330, 332 representing welding tasks. In order for the robot 172 to perform each weld 328, 330, 332 without interfering with other objects in the workcell 170, such as other robots in the workcell 170, the position of the robot 172 is shifted slightly between each weld 328, 330, 332, as depicted in the motion plan 300 of FIG. 3. After the offline planner 120 has determined the appropriate position for the robot 172 to perform each weld 328, 330, 332, and the entry points 316, 320, 324 and exits points 318, 322, 326 of each weld skill 304, 306, 308 necessary to avoid interference with other objects in the workcell 170, the offline planner plans the movements of the robot to transition between each weld 328, 330, 332 to generate the motion path 302. As previously discussed, the welds 328, 330, 332 are each sensor-based interactions. Therefore, the offline planner 120 cannot plan the movements of the robot 172 required to complete each of these welds 328, 330, 332, as real-time feedback from sensors in the workcell 170, such as sensor feedback regarding the location of component to be welded, is necessary to plan these movements. As described in further detail herein, in some implementations, the online execution engine 150 of the online execution system 110 can update the initial motion plan 300 generated by the offline planner 120 to update the path 302 based on real-time feedback from sensor(s) 171 indicating the status of the welds 328, 330, 332 being performed by the robot 172.

Once the online planner 110 receives the initial motion plan 300, the online planner 110 can send commands 155 to the robot interface subsystem 160 to cause the robot 172 to follow the initial motion plan 300.

During execution of the initial motion plan 300 by the robot 172, the online execution system 110 receives an updated sensor observation 145 and, based on the sensor observation, generates an initial modified local trajectory for the robot (204). As previously discussed, the online observations 145 provided by the sensor(s) 171 allow for real-time adjustment of the movement of the robot 172 in order to perform sensor-based interactions 328, 330, 332. In some implementations, the updated sensor observation 145 includes data collected by one or more sensors 171 within the workcell 170 and indicates a physical state of the robot 172 or another component within the workcell 170. In some implementations, the online observation 145 is first communicated by the sensor(s) 171 to the robot interface subsystem 160 in real-time, and the robot interface subsystem 160 then transmits the online observation 145 to the online execution system 110.

Figure 4:
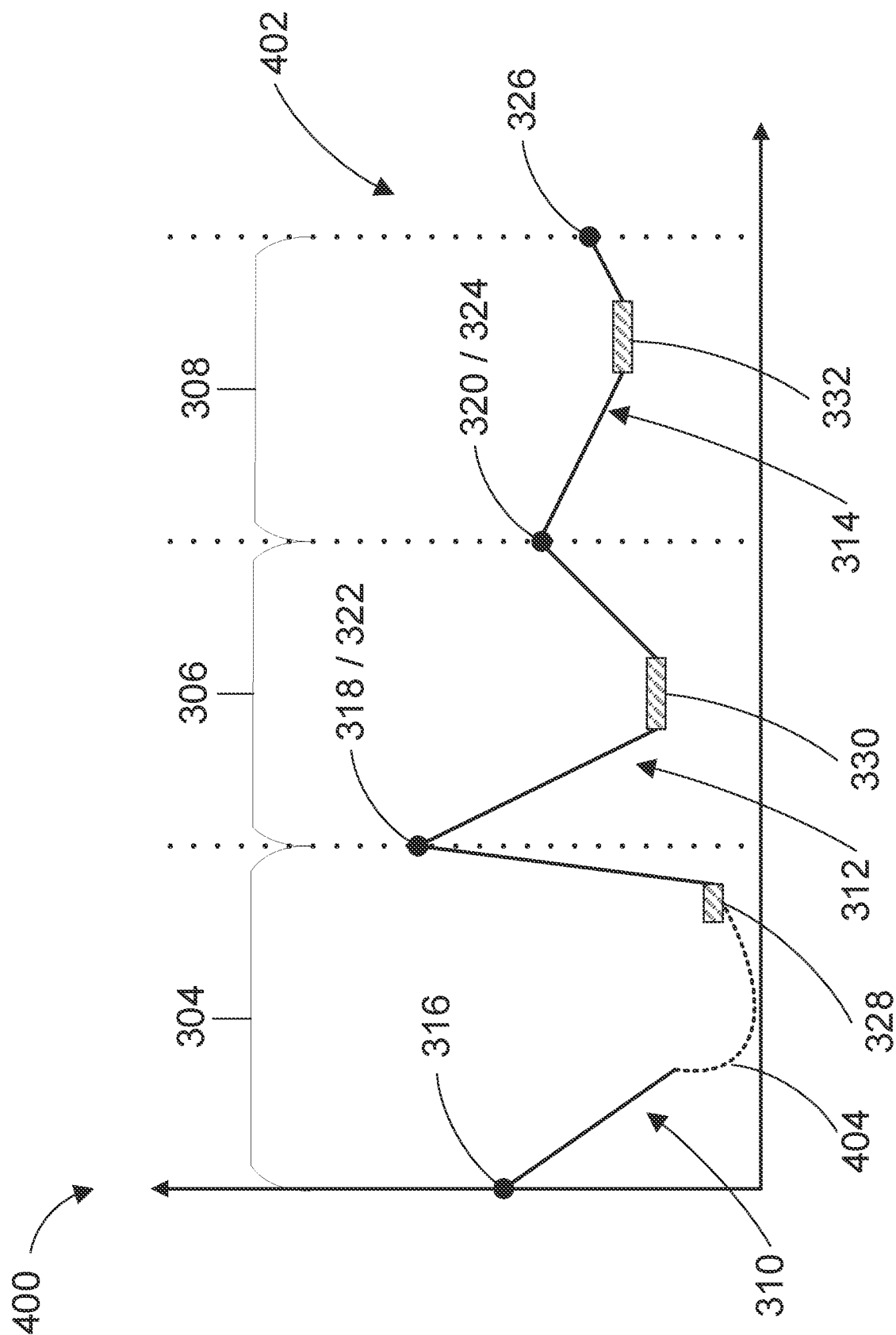
FIG. 4 illustrates an updated motion plan with an initial modified local trajectory for a robot.

FIG. 4 depicts an example motion plan 400 with an updated path 402 that includes an initial modified local trajectory 404 generated by the online execution engine 150 of the online execution system 110. The initial modified local trajectory 404 is generated by the online execution engine 150 based on the online observations provided from the sensors 171 in the workcell 170 to online system 110 via the robot interface subsystem 160.

For example, as previously discussed, the first skill 304 in the initial motion plan 300 can be a weld skill with a sensor-based weld interaction 328. Based on feedback received from the sensor(s) 171 in the workcell 170, the online execution system 110 determines that the object to be welded by the robot 172 is not in the location anticipated by the initial motion plan 300. In response, the online execution engine 150 generates a modified motion plan 400 with an initial modified local trajectory between the robot's 172 current location in the workcell 170 and the updated location in the workcell 170 for performing the weld interaction 328.

The initial modified local trajectory 404 defines an optimized path for the robot 172 to travel in order to perform the sensor-based interaction 328 of the first skill 304 based on the online observations 145 provided by the sensor(s) 171. For example, as depicted in FIG. 4, the optimized path for the robot 172 is an arc-shaped movement between the current position of the robot 172 to the position required to execute the sensor-based interaction 328 because the arc shape is an easy movement for the joint of the robot 172.

In some implementations, the initial modified local trajectory 404 is determined at least partly based on the dynamic constraints of the robot 172. For example, the maximum torque of each of the joints of the robot 172 is known. The maximum torque data for the robot 172 can be provided to a dynamic model to determine the maximum acceleration capacity of the robot 172. Based on the maximum acceleration capacity of the robot 172, the online execution engine 150 can determine an initial modified local trajectory. For example, upon receiving the online observations 145 regarding the workcell 170, the dynamic model assumes that the robot 172 is in an arbitrary state of motion, and, based on the maximum acceleration determined for the robot 172 and the online observations 145 received from the sensor(s), a locally optimized trajectory 404 for the robot 172 can be determined.

The initial modified local trajectory 404 can be computed by the online execution engine 150 of the online execution system 110 in real time in response to receiving the online observations 145 from the robot interface subsystem 160. In some implementations, the initial modified local trajectory 404 is determined within a first time threshold, e.g., in under 0.1, 1, 5, or 10 milliseconds, to name just a few examples. The initial modified local trajectory 404 generated by the online execution engine 150 is a locally optimal trajectory, such that the accuracy of the acceleration capacity determined by the dynamic model decreases when extended beyond the first time threshold for the initial modified local trajectory 404. For example, due to the changing position and orientation of the robot 172 as it traverses the initial modified local trajectory 404, the acceleration capacity of the robot 172 may change from those predicted for the initial modified local trajectory 404.

In some implementations, prior to controlling the robot 172 to follow the initial modified local trajectory 404, the online execution system 110 determines whether a first time constraint has been violated (208). In some implementations, if the first time constraint has been violated, the online execution system 110 enters a fault state (210). As previously discussed, in a fault state, the online execution system 110 can halt execution or take some other action that interrupts normal operation of the robot 172. In some implementations, determining whether the first time constraint has been violated is based on comparing the amount of time expended generating the initial modified local trajectory (204) to the first time constraint. For example, if the time expended generating the initial modified local trajectory (204) exceeds the first time constraint, the online execution system 110 enters a fault state (210). In some implementations, the first time constraint is in a range of about 1 millisecond to about 3 milliseconds. In some implementations, a human operator 175 can define the first time constraint within the online execution system 110.

In some implementations, the online execution system 110 determines whether the initial modified local trajectory 404 generated by the online execution system 150 crosses a workspace footprint boundary associated with the robot 172 (212). For example the online execution system 110 can obtain data regarding the workspace footprint(s) for the robot 172 from the offline planner 120 and can determine whether the initial modified local trajectory is contained within the footprint(s).

The workspace footprint data received by the online execution system 110 defines one or more volumetric spaces that a robot 172 can occupy while performing the skills 304, 306, 308 in the initial motion plan 300 in order to avoid interference with other physical objects in the workcell 170. For example, a workspace footprint can be calculated that constrains the robot 172 during execution of a particular skill in order to prevent interference with any other robots within the workcell 170. In addition, by keeping the robot 172 within a predefined workspace footprint during execution of a particular skill, a human operator can safely work alongside the robot 102 in the workcell 170 while the robot 172 by staying outside of the workspace footprint during performance of the respective skill by the robot 172.

Figure 5:
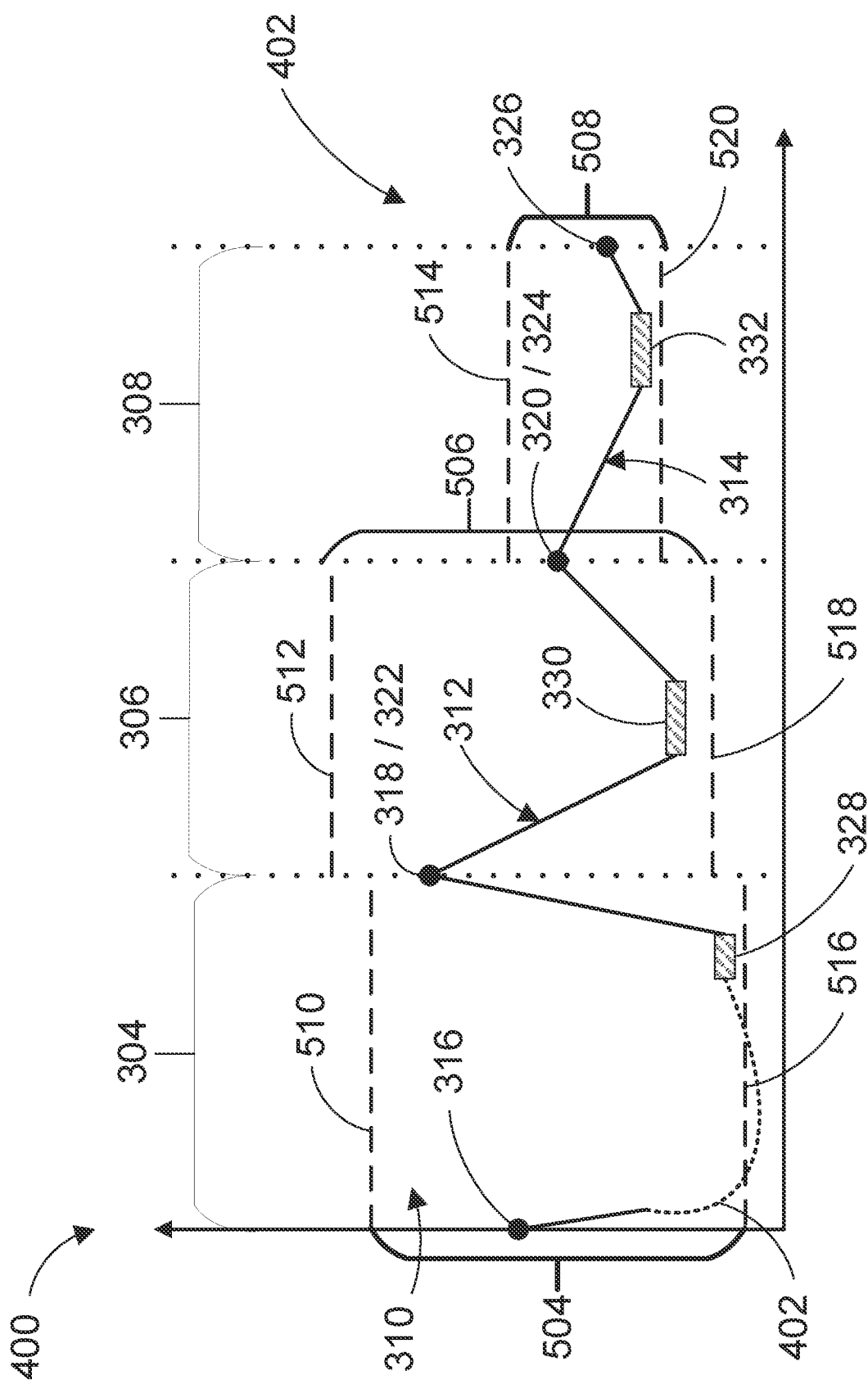
FIG. 5 illustrates the motion plan of FIG. 4 with workspace footprints.

FIG. 5 depicts the updated motion plan 400 of the FIG. 4 with workspace footprints 504, 406, 508 for the robot 172. As depicted in FIG. 5, a workspace footprint 504, 506, 508 can be received for each skill 304, 306, 308 in the motion plan 400. Each workspace footprint includes an upper boundary 510, 512, 514 and a lower boundary 516, 518, 520, respectively. The upper boundaries 510, 512, 514 and lower boundaries 516, 518, 520 define the space in the workcell 170 within which the robot 172 can move while performing each respective skill 304, 306, 308.

In some implementations, each workspace footprint 504, 506, 508 is generated by the offline planner 120 prior to execution of the initial motion plan 300. For example, as part of generating the initial motion plan 300 for the robot 172, the offline planner 120 can define spatial boundaries (i.e., a workspace footprint) in which the robot 172 will be restricted during the performance of each skill 304, 306, 308 in the initial motion plan 300. In some implementations, computing the workspace footprint 504, 506, 508 for each skill 304, 306, 308 prior to execution of the motion plan by the robot 172 reduces the online computational load of the online execution system 110, which enables faster real-time motion planning by the online execution engine 150. In some implementations, the offline planner 120 coordinates the initial plans of each robot 172a-172n within the workcell 170 to optimize the workspace footprint for each skill performed by each robot 172a-127n, while also avoiding interference or collision between the robots 172a-172n.

While the motion plans 300, 400, 600 depicted in FIGS. 3-6 depict movement of a robot 172 in a single dimension over time, the motion plan generated for the robot can provide the robot's 172 motion in multiple dimensions over time (e.g., x, y, and z Cartesian directions). Similarly, while the workspace footprints 504, 506, 508 are depicted as including boundaries in a single dimension, the workspace footprints for each skill to be executed by the robot 172 can include boundaries in each dimension in which the robot 172 can operate. In some implementations, the dimensions captured by the motion plan and workspace footprint(s) for the robot 172 are dependent on the degrees of freedom of motion of the robot 172.

In some implementations, the offline planner 120 receives an input from one or more human operators 175, and the offline planner 120 defines the workspace footprint 504, 506, 508 for each skill 304, 306, 308 based at least in part on the input provided by the human operator(s) 175. For example, a human operator 175 may define an absolute maximum boundary and an absolute minimum boundary for the robot 172 to stay within when performing a particular skill. Based on the maximum and minimum boundary provided by the human operator 175, the offline planner 120 can determine an optimized footprint for the skill that is within the boundaries provided by the human operator 175. For example, the offline planner 120 may designate a footprint that is between outer boundaries provided by the human operator 175. By allowing a human operator 175 to provide outer boundaries for the workspace footprint generated by the offline planner 120 for a particular skill, the human operator 175 can safely work within the workcell 170 outside the specified boundaries without interfering with the robot's performance of the respective skill. In some implementations, the human operator 175 can provide maximum and minimum boundaries that the robot 172 must remain within for all skills, and the offline planner 120 determines a workspace footprint 504, 506, 508 for each skill 304, 306, 308 that are each within the maximum and minimum boundaries specified by the human operator 175. By allowing a human operator 175 to provide outer boundaries for the robot 172 throughout the entire motion plan 300, 400, the human operator 175 can safely work within the workcell 170 outside the specified boundaries without interfering with the robot's performance of the any of the skills specified in the motion plan 300.

In some implementations, the workspace footprints 504, 506, 508 are generated in real-time by the online execution system 110. For example, while generating a modified global path (as described in further detail herein), the online execution engine 150 can determine one or more workspace footprints 504, 506, 508 for the one or more skills 304, 306, 308 in the motion plan 400.

As previously discussed, the initial modified local trajectory 404 generated by the offline execution system 150 defines an optimized path for the robot 172 to travel in order to perform the sensor-based interaction 328 of the first skill 304 based on the online observations 145 provided by the sensor(s) 171. However, the most optimized path determined for the initial modified local trajectory 404 may extend outside a workspace footprint of the robot 172. For example, as depicted in FIG. 5, the arc-shaped trajectory of the initial modified local trajectory 404 generated by the online execution engine 150 extends outside the lower boundary 516 of workspace footprint 504 for the first skill 304. However, if the robot 172 is controlled to follow the initial modified local trajectory 404 outside the workspace 504, the risk of the robot 172 interfering or colliding with another object in the workcell 170 is increased.

As depicted in FIG. 2, in response to the online execution system 110 determining that the initial modified local trajectory 404 generated by the offline execution engine 150 crosses a boundary of a workspace footprint of the robot 172 (212), the online execution engine 150 generates a modified global path that is contained with the workspace footprint(s) associated with the robot 172 (214). In some implementations, the online execution engine 150 generates a modified global path, regardless of whether the modified initial local trajectory 404 crosses a boundary of a workspace footprint for the robot 172.

Figure 6:
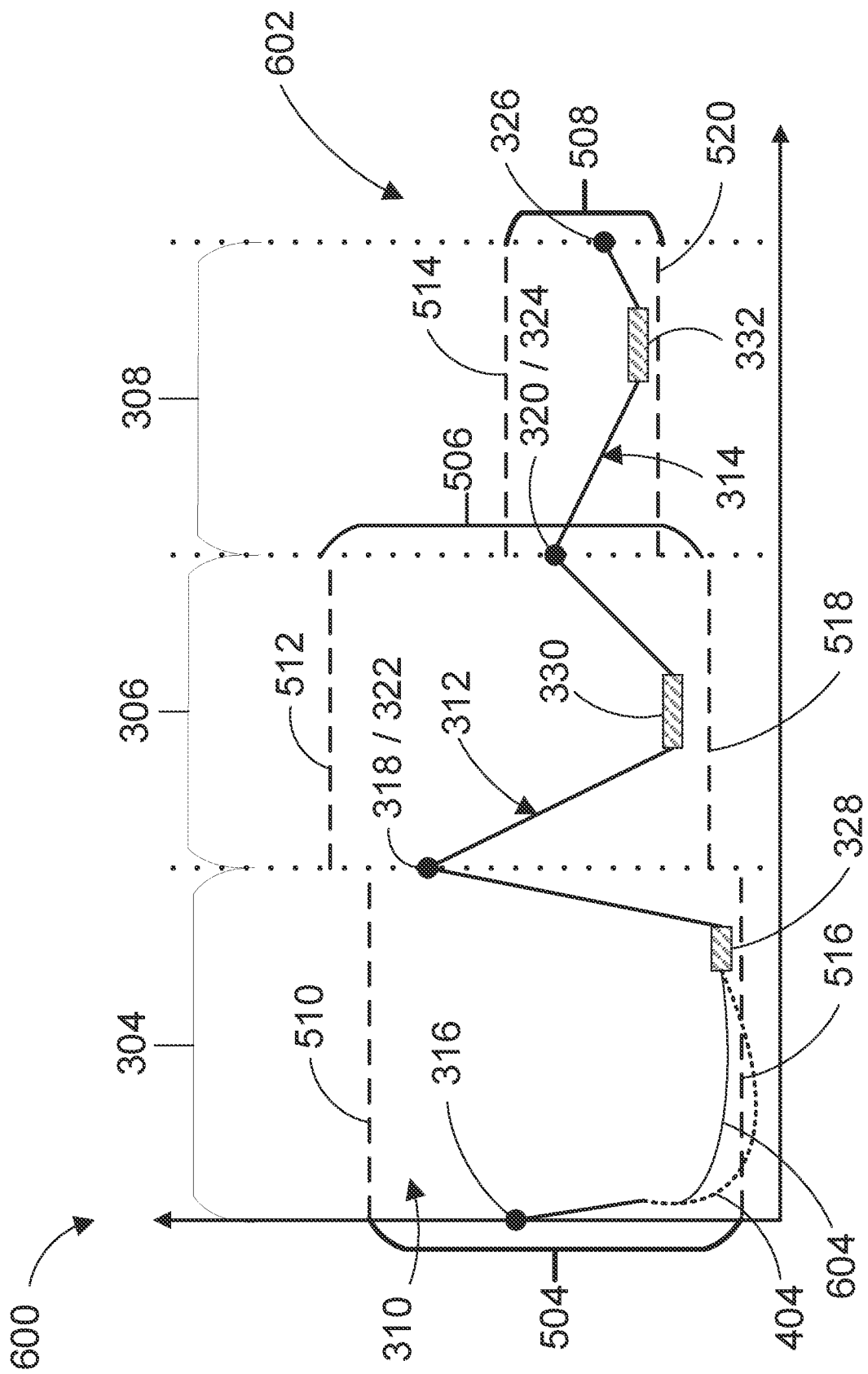
FIG. 6 illustrates an updated motion plan with a modified global path.

The modified global path generated by the online execution engine 150 provides an optimized path for the robot 172 to follow beyond the initial modified local trajectory 404. FIG. 6 depicts an updated motion plan 600 with an updated path 602 that includes an example modified global path 604 for performing the first skill 304. As depicted in FIG. 6, the modified global path 604 extends from a point along the initial modified local trajectory 404 generated by the online execution system 110. In some implementations, the modified global path 604 extends from a point along the initial modified local trajectory 404 that is further along that local trajectory 404 than the starting point of the local trajectory 404 or the current position of the robot 172 in order to account for the processing time required to generate the modified global path 604. The modified global path 604 is generated by the online execution engine 150 while the online execution system 110 is simultaneously causing the robot 172 to follow the initial modified local trajectory 404.

In some implementations, the modified global path 604 for the robot 172 is generated based on the same acceleration capacities determined by the online execution engine 150 for generating the initial modified local trajectory 404. In some implementations, the online execution engine 150 generates the modified global path within a second time threshold, e.g., in under 15, 20, 25, 30 milliseconds, to name just a few examples In some implementations, the online execution engine 150 extends the initial modified local trajectory 404 based on the acceleration capacities determined for the initial modified local trajectory 404 in order to generate the modified global path 604. In some implementations, the modified global path 604 is generated for an amount of time in which the dynamics of the robot 172 are determined to be relatively predictable based on a set of online observations 145 received from the sensor(s) 171 (for example, about 20 milliseconds). The modified global path 604 generated by the online execution engine 150 accounts for the dynamic constraints of the robot 172 throughout the entire motion 606 defined by the modified global path 604.

As depicted in FIG. 6, the modified global path 604 generated by online execution engine 150 is contained within and does not extend outside of the workspace footprint 504, 506, 508 for each skill 304, 306, 308 in the motion plan 600. A path generated based on the acceleration capacity for the robot 172 alone may extend beyond the boundaries of the workspace footprint(s) 504, 506, 508. However, in order to prevent the robot 172 from travelling outside the designated workspace footprint(s) 504, 506, 508, the online execution engine 150 constrains the modified global path 604 generated based on online observations 145 and acceleration capacities to remain within the boundaries of the workspace footprint(s) 504, 506, 508. For example, in order to keep the robot 172 within the workspace footprint 504 of the first skill 304, a more complicated movement than that determined for the initial modified local trajectory 404 is required to ensure that the robot 172 does not leave the footprint 504. As shown in FIG. 6, for example, in generating the modified global path 604, the online execution engine 150 adjusts the motion of a component of the robot 172 upward to prevent the robot 172 from crossing a boundary 516 of the workspace footprint 504 when travelling to execution the sensor-based interaction 328 of the first skill 304. By keeping the modified global path 604 of the robot 172 within the workspace footprint 504, 506, 508 of each skill 304, 306, 308, the online execution system 110 can ensure that the robot 172 does not interference with other objects within the workcell 170, such as other robots within the workcell 170.

As the online execution engine 150 generates an updated modified global path 604 within the workspace footprint(s) (214), the online execution system 110 controls the robot 172 to act on the initial modified local trajectory (216). For example, the online execution system 110 sends commands 155 to the robot interface subsystem 160 corresponding to the initial modified local trajectory 404, and the robot interface subsystem 160 causes to robot 172 to execute the commands 155 corresponding to following a portion of the initial modified local trajectory 404 in real-time.

Throughout the process of planning the modified global path 604, the online execution system 110 repeatedly checks whether the planning of the modified global path 604 is complete (220). For example, once the robot has completed acting on the initial modified local trajectory for the first time threshold (216), the online execution engine determines whether the planning of the modified global path 604 is complete (220). As depicted in FIG. 2, if the online execution engine 150 is still planning (218) the modified global path 604, the online execution engine causes the robot 172 to continue to act on the initial modified local trajectory 404 (216). For example, once the robot has followed the initial modified global trajectory for an amount of time equal to the first time threshold (e.g., 1 millisecond), the online execution engine can determine whether the planning of the modified global path is complete (220). Upon determining that the planning of the modified global path is incomplete, the online execution engine 110 can send commands 135 to the robot interface subsystem to cause the robot 172 to continue to act on the initial local modified local trajectory 404 for another period of time equal to the first time threshold (216). As depicted in FIG. 5, the online execution system 110 continues to control the robot 172 to act on the initial modified local trajectory 404 until the online execution engine 150 finishes planning the modified global path (220).

In some implementations, the online execution engine 150 repeatedly generates a new modified local trajectory in response to receiving additional updated environment information from one or more sensors 171 in the workcell 170. For example, after controlling the robot 172 to act on the initial modified local trajectory 404 (216) and determining that the online execution engine is still planning the modified global path (220), the sensor(s) 171 can provide updated online observations 145 to the online execution system 110 via the robot interface subsystem 160. In response to receiving the updated online observations 145, the online execution engine 150 can generate an updated modified local trajectory within the first time threshold. The online execution system 110 can then send commands 155 to the robot interface subsystem 160 to cause the robot 172 to follow the updated modified local trajectory. This process can be continually repeated while the online execution system plans a modified global path (218).

Once the online execution system has finished planning the modified global path 604 for the robot 172 within the workspace footprint(s) 504, 506, 508, the online execution system 110 determines whether a second time constraint has been violated (222). In some implementations, if the second time constraint has been violated, the online execution system 110 enters a fault state (210). As previously discussed, when in the fault state, the online execution system 110 can halt execution or take some other action that interrupts normal operation of the robot 172. In some implementations, determining whether the second time constraint has been violated is achieved by comparing the amount of time expended generating the modified global path 604 (214) to the predefined second time constraint. For example, if the time expended generating the modified global path 604 (214) exceeds the second time constraint, the online execution system 110 enters a fault state (210). In some implementations, the second time constraint is larger than the first time constraint. In some implementations, the second time constraint is in a range of about 20 milliseconds to about 25 milliseconds. In some implementations, a human operator 175 can define the second time constraint within the online execution system 110.

As depicted in FIG. 2, if the online execution system determines that the second time constraint has not been violated, the online execution system 110 modifies the motion plan 600 to replace the initial modified local trajectory 404 with a modified global path 604 that does not cross any boundaries of the workspace footprint(s) 504, 506, 508 for the robot 172 (224). Once the motion plan has been update with the modified global path 604, the online execution system 110 causes the robot 172 to follow the modified global path 604. For example, the online execution system 110 transmits commands 155 to the robot interface subsystem 160 corresponding to the modified global path 604. In response to receiving the commands 155 corresponding to the modified global path 604, the robot interface subsystem 160 causes the robot 172 to follow the modified global path 604 in real-time.

In some implementations, the process of generating an initial modified local trajectory 404 and a modified global path 604, and causing the robot 172 to follow the initial modified local trajectory 404 and the modified global path 604 is continuously repeated as the robot 172 executes each of the skills 304, 306, 308 defined by the initial motion plan 300. For example, as depicted in FIG. 2, once the motion plan 300, 400, 600 is updated to replace the initial modified local trajectory 404 with the modified global path and as the robot 172 is controlled to follow the modified global path 604 (224), the online execution system 110 receives updated online observations 145 about the workcell 170 environment from the sensor(s) 171. Based on the updated online observations 145 and the updated motion plan 600, the online execution engine 150 can generate a second initial modified local trajectory and a second global path for the robot 172 to follow upon completing execution of the first modified global path 604. This process of providing updated modified local trajectories and updated modified global paths can be repeated until the online execution system 110 determines that robot 172 has completed all of the skills 304, 306, 308 specified in the initial motion plan 300.

Figure 7:
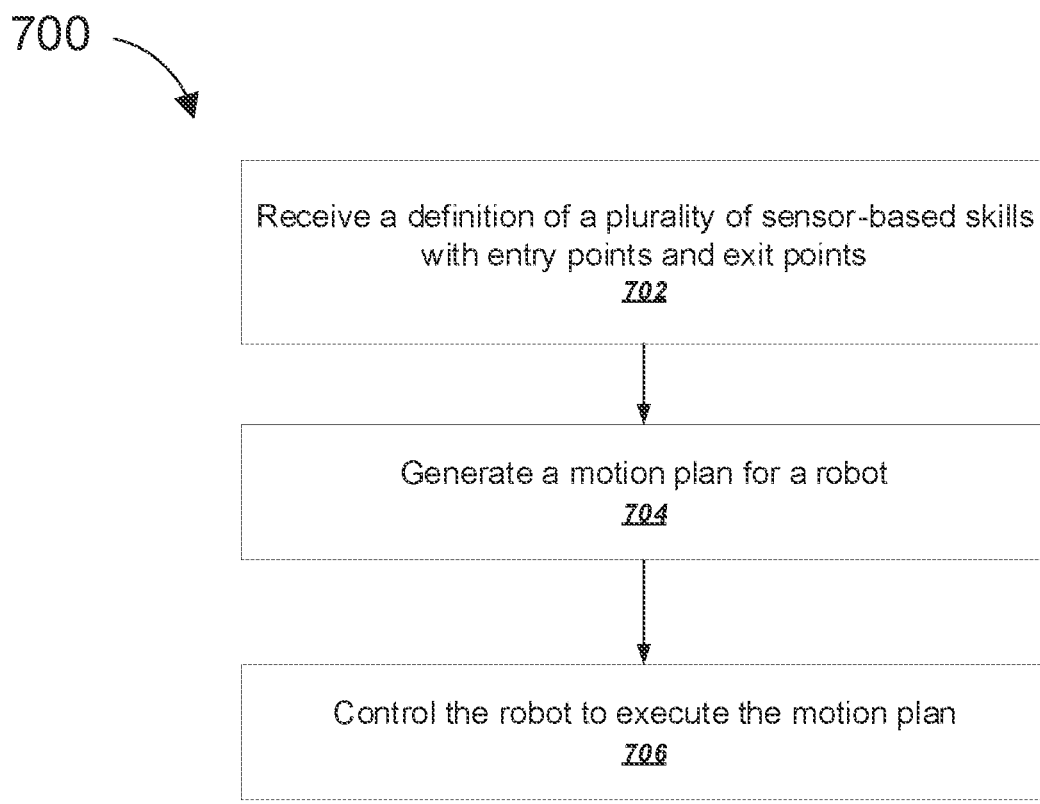
FIG. 7 is a flowchart of an example process for generating and optimizing motion plans for sensor-based skills performed by a robot.

In addition to generating a modified local trajectory and modified global path, the online execution system 110 can plan and optimize the transitions between sensor-based interactions in a motion plan. FIG. 7 is a flowchart for an example process 700 for generating and optimizing a motion plan for a robot (e.g., robot 172 of FIG. 1) using the example system 100 of FIG. 1. As depicted in FIG. 7, the system 100 receives a definition of a plurality of skills to be executed in sequence by a robot (702). For example, the offline planner 120 can receive a definition of a sequence of skills to be performed by a particular robot 172 in a workcell 170. In some implementations, a human operator(s) 175 specifies the types of skills and the order of skills to be performed by the robot 172, and transmits the sequence of skills to the offline planner 120.

Each skill in the sequence received by the system 100 is associated with a start point and an end point. In some implementations, the offline planner 120 automatically generates the start and end points for each of the skills based on the workcell 170 environment. For example, the offline planner 120 may determine the start and end points for each skill to be performed by a particular robot 172 based on other skills and movements to be simultaneously performed by other robots 172a-172n within the workcell 170. In some implementations, a human operator 175 designates a start point and an end point for each skill in the sequence received by the system 100.

In some implementations, the performance of each skill in the sequence is based on feedback received in real-time during performance of the skill by the robot 172 from one or more sensors 171 in the workcell 170. As previously discussed, the sensors 171 can include any suitable sensors, such as distance sensors, force sensors, torque sensors, cameras, etc. In some implementations, real-time sensor feedback is required to determine the motions necessary to complete each of the sensor-based interactions of a skill. Therefore, the offline planner 120 cannot generate a fully constrained motion plan for skills that include sensor-based interaction(s) prior to execution of the respective sensor-based interactions.

In some implementations, each skill in the sequence received by the system 100 is associated with a workspace footprint. As previously discussed, in some implementations, a workspace footprint defines a spatial region within which the robot 172 will be constrained during the performance of the respective skill(s). In some implementations, a workspace footprint defines a spatial region that the robot 172 will not enter (i.e., stay out of) during execution of an associated skill. In some implementations, the offline planner 120 coordinates the skills to be performed by each robot 172a-172n within the workcell 170 to optimize the workspace footprint for each skill performed by each robot 172a-127n, while also avoiding interference or collisions between the robots 172a-172n.

In some implementations, the offline planner 120 receives an input from one or more human operators 175, and the offline planner 120 defines the workspace footprint for each skill based at least in part on the input provided by the human operator(s) 175. For example, a human operator 175 may define an absolute maximum boundary and an absolute minimum boundary for the robot 172 when performing a particular skill. Based on the maximum and minimum boundaries provided by the human operator 175, the offline planner 120 can determine an optimized footprint for the skill within the boundaries provided by the human operator 175. In some implementations, the human operator 175 can provide maximum and minimum boundaries that the robot 172 must remain within for all skills, and the offline planner 120 can determine a workspace footprint for each skill within the maximum and minimum boundaries specified by the human operator 175. By allowing a human operator 175 to provide outer boundaries for the robot 172 throughout the entire motion plan, the human operator 175 can safely work within the workcell 170 outside the specified boundaries without interfering with the robot's performance of the skills in the motion plan.

As depicted in FIG. 7, the system 100 generates a motion plan for the robot based on the sequence of skills and the corresponding entry and exit points (704). As previously discussed, a motion plan is a data structure that provides information for executing an action. In some implementations, the motion plan is generated by the offline planner 120. For example, prior to execution of the sequence of skills received by the system 100, the offline planner 120 can generate a motion plan that defines a path for the robot 172 to follow in order to complete each of the skills in the sequence. In some implementations, the motion plan generated by the offline planner 120 is underconstrained. For example, as previously discussed, the sequence of skills can include one or more sensor-based skills that require real-time sensor feedback in order to determine the movements required to complete the respective skill. As such, the offline planner 120 cannot generate a fully constrained motion plan for these sensor-based skills prior to execution of the skills.

Figure 8:
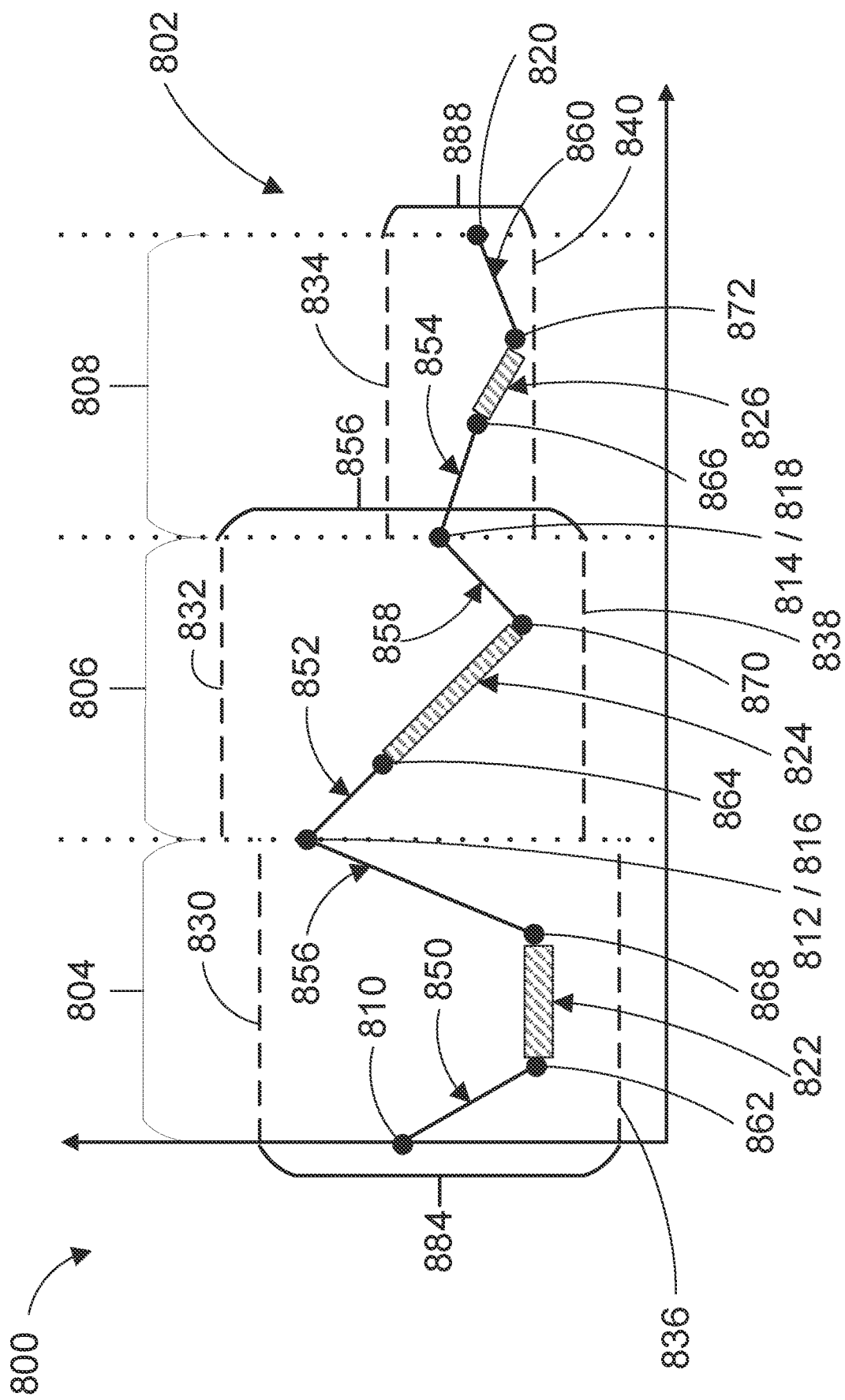
FIGS. 8-10 illustrate generating motion plans for a robot. Like reference numbers and designations in the various drawings indicate like elements.

FIG. 8 depicts an example a motion plan 800 generated by the offline planner 120 based on an example definition of a sequence of skills received by the system 100. As depicted in FIG. 8, the motion plan 800 defines a path 802 that the robot 172 follows in order to perform the sequence of skills 804, 806, 808. As depicted in FIG. 8, each of the skills includes an entry point 810, 812, 814 and an exit point 816, 818, 820. Further, each of the skills 804, 806, 808 in the motion plan 800 includes a sensor-based interaction 822, 824, 826. As depicted in FIG. 8, in some implementations, the exit point for some of the skills is also the entry point for other skills. For example, the exit point 816 for the first skill 804 in the motion plan 800 is also the entry point 812 for the second skill 806 in the motion plan 800. Similarly, the exit point 818 of the second skill 806 is also the entry point 814 for the third skill 808 in the motion plan 800. As such, the robot 172 moves smoothly between each of the skills 804, 806, 808 in the motion plan 800.

As depicted in FIG. 8, the offline planner 120 generates a path 850, 852, 854 between the entry point 810, 812, 814 of each skill 804, 806, 808 and a point 862, 864, 866 corresponding to the beginning of the sensor-based interaction 822, 824, 826 of the respective skill 804, 806, 808. For example, the offline planner 120 generates a path 850 between the entry point 810 of the first skill 804 to a point 862 corresponding to the beginning of the sensor-based interaction 822 of the first skill 804. In addition, the offline planner 120 generates a path 856, 858, 860 between a point 868, 870, 872 corresponding to the end of the sensor-based interaction 822, 824, 826 of each skill 804, 806, 808 to the exit point 816, 818 820 of the respective skill 804, 806, 808. For example, the offline planner 120 generates a path 856 from a point 868 corresponding to the end of the sensor-based interaction 822 of the first skill 804 to the exit point 816 of the first skill 804.

As further depicted in FIG. 8, each of the skills 804, 806, 808 is associated with a respective workspace footprint 884, 886, 888. In some implementations, the workspace footprint 884, 886, 888 is specific to and different for each of the skill 804, 806, 808. As depicted in FIG. 8, each workspace footprint 884, 886, 888 includes an upper boundary 830, 832, 834 and a lower boundary 836, 838, 840. The upper boundaries 830, 832, 834 and lower boundaries 836, 838, 840 define the respective workspace footprints 804, 806, 808 within which the robot 172 can move while executing each respective skill 804,806, 808. In some implementations, the boundaries of the workspace footprints 884, 886, 888 are generated by the offline planner 120 during generation of the motion plan 800 for the sequence of skills 804, 806, 808. In some implementations, a human operator 175 can provide boundaries to the offline planner 120, and the offline planner 120 can use the boundaries provided by the human operator 175 to determine an optimal workspace footprint for each skill 804, 806, 808 to be performed by the robot 172. As depicted in FIG. 8, the path 802 is contained within and does not extend outside the workspace footprints 884, 886, 888 of each of the skills 804, 806, 808 in the motion plan 800.

Figure 9:
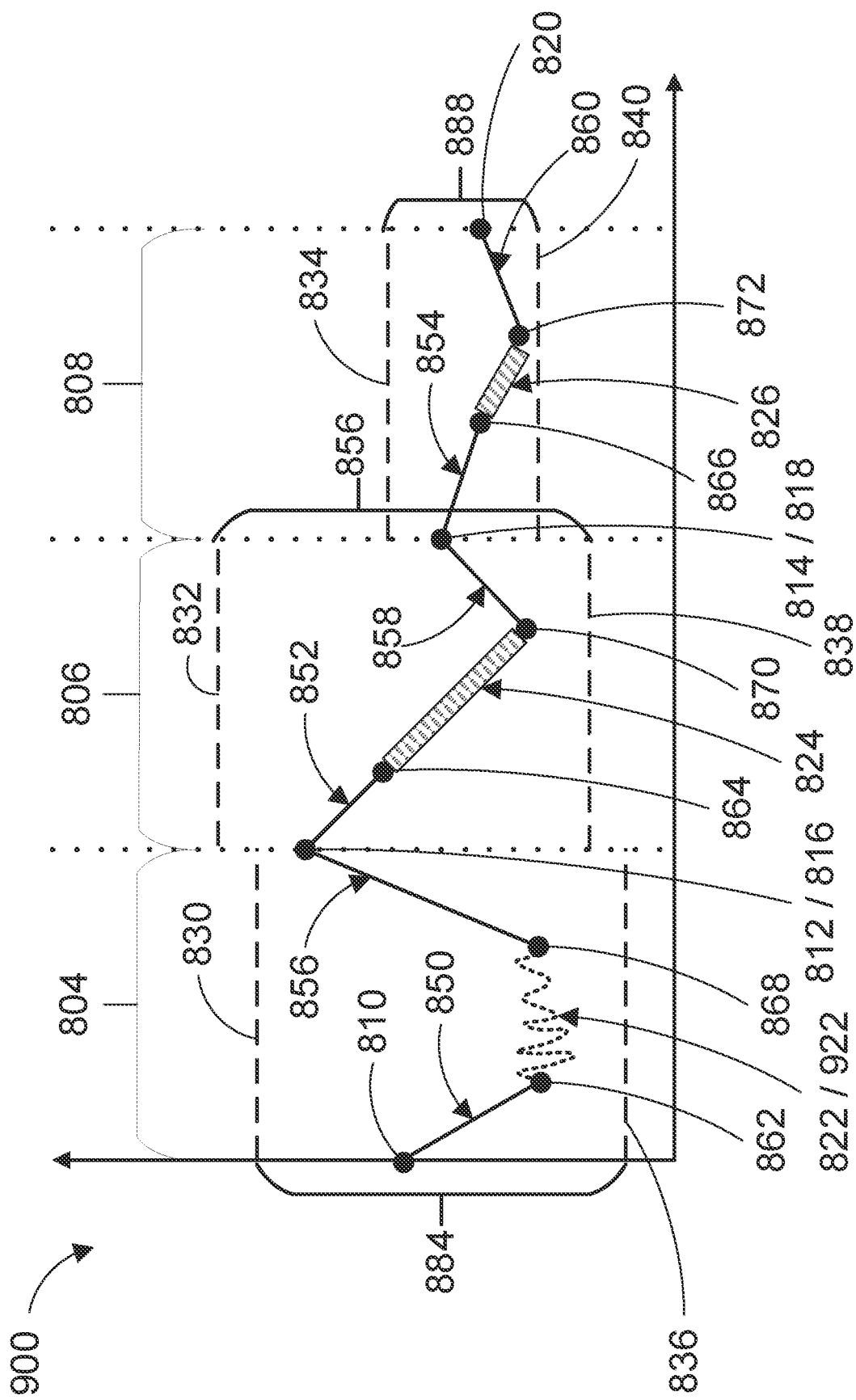

Once the offline planner 120 has generated the motion plan 800 for the received sequence of skills, the system 100 controls the robot to execute the motion plan (706). For example, the online execution system 110 sends commands 155 to the robot interface subsystem 160 to cause the robot 172 to follow the path 850 from the entry point 810 of the first skill 804 to the starting point 862 of the sensor-based interaction 822 of the first skill 804. Once the robot reaches the sensor-based interaction 822 of the first skill 804, the online execution system 110 controls the robot 172 to perform the sensor-based interaction 822 based on feedback received from sensor(s) 171 in the workcell 170. For example, in some implementations, the online execution engine 150 updates the motion plan for the robot 172 in real-time during the performance of the sensor-based interactions 822, 824, 826. FIG. 9 depicts an updated motion plan 900 generated by the online execution engine 150 in response to sensor signals received during execution of the sensor-based interaction 822 of the first skill 804. As depicted in FIG. 9, as the robot 172 performs the sensor-based interaction 822 of the first skill 804, the motion plan 900 is updated by the online execution engine 150 in real-time with an updated path 922 to reflect the movements required for the robot 172 to complete the sensor-based interaction 822, as determined based on feedback from one or more sensors 171 within the workcell 170.

Once the sensor-based interaction 822 of the first skill 804 is complete (as determined based on real-time feedback from the sensor(s) 171 in the workcell 170), the online execution system 110 controls the robot 172 to move along path 856 from the end point 868 of the sensor-based interaction 822 to the exit point 816 of the first skill 804. As previously discussed, the online execution system 110 can control the movement of the robot 172 by sending commands 155 to the robot interface subsystem 160 that correspond to the path 802, 902 of the motion plan 800, 900. The robot interface subsystem 160 then controls the robot 172 to execute the commands generated by the online execution system 110.

The process of controlling the robot 172 to execute a sensor-based skill can be repeated for each skill 804, 806, 808 in the motion plan 800, 900. As previously discussed, in some implementations, the exit point for a first skill is the entry point for the subsequent skill, which allows for smooth movement between each skill 804, 806, 808 in the motion plan 800, 900.

Figure 10:
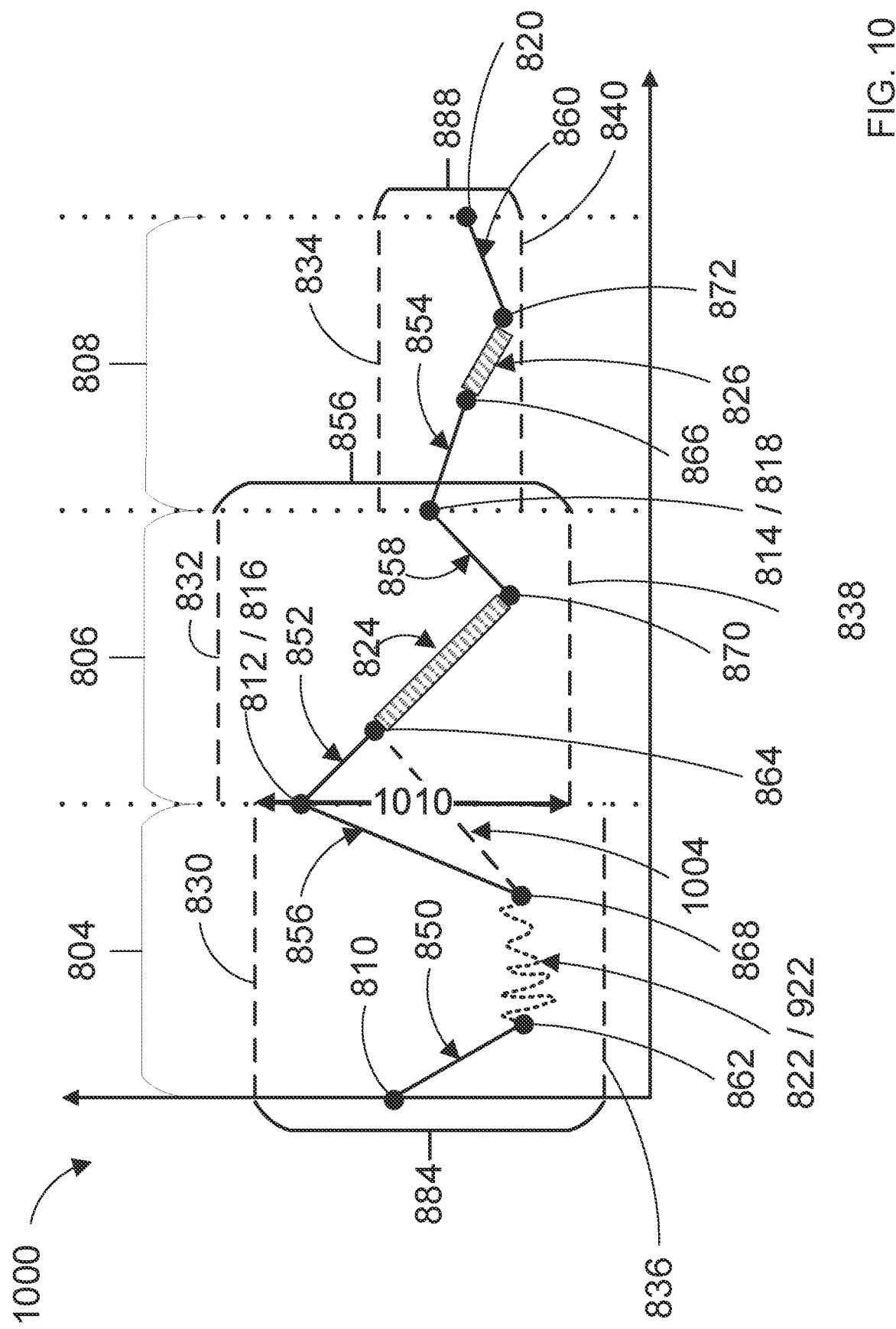

In some implementations, the online execution engine 120 updates the entry point and/or exit point of one or more sensor-based skills 804, 806, 808 during execution of the motion plan 800 based on the online observations 145 received by the online execution system 110 from sensor(s) 171 within the workcell 170. For example, as depicted in FIG. 10, upon determining the spatial location of the end point 868 of the sensor-based interaction 822 for the first skill 804, the online execution engine 150 can generate an updated motion plan 1000 with an updated path 1004. As can be seen in FIG. 10, the updated path 1004 transitions the robot 172 directly from the end point 868 of the first sensor-based interaction 822 to the start point 864 of the sensor-based interaction 824 of the second skill 806. In some implementations, determining whether an updated path 1004 between the first and second skills 804, 806 can be generated involves determining whether a path 1004 between the end point 868 of the first sensor-based interaction 822 to the start point 864 of the sensor-based interaction 824 of the second skill 806 is within the overlap region 1010 of the first workspace footprints 884, 886 of the first and second skill 804, 806. By generating an updated path 1004 between the first and second skill 804, 806 that is within the overlap 1010 of the workspace footprint 884, 886 of each of the respective skills 804, 806, the online execution system 110 can ensure that the robot 172 will not interfere with other objects or robots in the workcell 170 when travelling along the updated path 1004. As depicted in FIG. 10, the updated path 1004 does not go outside the boundaries of either the first workspace footprint 884 or the second workspace footprint 886.

As can be seen in FIG. 10, by generating an updated path 1004 directly between the end point 868 of the sensor-based interaction 822 of the first skill 804 and the start point 864 of the sensor-based interaction 824, the robot 172 bypasses paths 856 and 852 through the entry point 812 of second skill 806 (which is also the exit point 816 of the first skill 804). In some implementations, generating an updated path 1004 directly between the end point 868 of a first sensor-based interaction 822 and the start point 864 of a subsequent sensor-based interaction 824 reduces the overall distance that must be travelled by the robot 172, and thus reduces the time required to transition between the sensor-based interactions 822, 824. As such, generating updated paths between sensor-based interaction in real-time during execution of the motion plan 800 can improve the overall all efficiency of performing the skills 804, 806.

While the motion plans 800, 900, 1000 depicted in FIGS. 8-10 depict movement of a robot 172 in a single dimension over time, the motion plan generated for the robot can provide the robot's 172 motion in multiple dimensions over time (e.g., x, y, and z Cartesian directions). Similarly, while the workspace footprints 804, 806, 808 are depicted as including boundaries in a single dimension, the workspace footprints for each skill to be executed by the robot 172 can include boundaries in each dimension in which the robot 172 can operate. In some implementations, the dimensions captured by the motion plan and workspace footprint(s) for the robot 172 are dependent on the degrees of freedom of motion of the robot 172.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the onsite execution engine 150 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g. a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML, page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 a method performed by a robotics control system comprising one or more computers, the method comprising:
    receiving, for a robot, an initial plan specifying a path and a local trajectory;
    receiving an updated observation of an environment of the robot;
    generating an initial modified local trajectory for the robot based on the updated observation in the environment of the robot;
    repeatedly following the initial modified local trajectory for the robot while generating a modified global path for the robot, comprising:

obtaining data representing a workspace footprint for the robot, the workspace footprint defining a volume for a workspace of the robot, and generating the modified global path to avoid causing the robot to cross a boundary of the volume defined by the workspace footprint; and causing the robot to follow the modified global path for the robot.

Embodiment 2 is the method of embodiment 1, wherein the robotics control system has a first time constraint on computing local trajectories and a second time constraint on computing modified global paths, wherein the second time constraint is larger than the first time constraint.

Embodiment 3 is the method of embodiment 2, wherein the robotics control system enters a fault state if the first time constraint is violated when not computing a modified global path.

Embodiment 4 is the method of embodiment 3, wherein the robotics control system enters a fault state if the second time constraint is violated when computing the modified global path.

Embodiment 5 is the method of any one of embodiments 1-4, wherein repeatedly following the initial modified local trajectory for the robot while generating a modified global path for the robot comprises bypassing a process for computing local trajectories from sensor observations.

Embodiment 6 is the method of any one of embodiments 1-5, wherein the workspace footprint is precomputed offline for the robot.

Embodiment 7 is the method of any one of embodiments 1-6, wherein generating the modified global path to avoid causing the robot to cross a boundary of the volume defined by the workspace footprint comprises generating a modified global path that causes the robot to remain within the volume defined by the workspace footprint.

Embodiment 8 is the method of any one of embodiments 1-7, wherein generating the modified global path to avoid causing the robot to cross a boundary of the volume defined by the workspace footprint comprises generating a modified global path that causes the robot to remain outside the volume defined by the workspace footprint.

Embodiment 9 is the method of any one of embodiments 1-8, wherein the workspace footprint is computed online in real-time for the robot.

Embodiment 10 is the method of any one of embodiments 1-9, wherein the modified global path extends from a point along the initial modified local trajectory.

Embodiment 11 is a robotics control system comprising: one or more processors; and a non-transitory storage medium storing computer instructions operable to cause the one or more processors to perform the method of any one of embodiments 1-10.

Embodiment 12 is a computer-readable storage medium comprising instructions that, when executed by one or more computers, cause the one or more computers to perform the method of any one of embodiments 1-10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a robotics control system comprising one or more computers, the method comprising:
    receiving, for a robot, an initial plan specifying a path and a local trajectory;
    receiving an updated observation of an environment of the robot;
    generating an initial modified local trajectory for the robot based on the updated observation in the environment of the robot, wherein the initial modified local trajectory extends outside of a boundary of a workspace footprint for the robot at the time that the initial modified local trajectory is generated, the workspace footprint defining a physical volume within a workcell for the robot to perform a task;
    repeatedly following the initial modified local trajectory that extends outside the footprint of the robot while generating a modified global path for the robot that remains entirely within the footprint of the robot until the modified global path has been generated, wherein generating the modified global path comprises:
        obtaining data representing the workspace footprint for the robot, and
        generating the modified global path to avoid causing the robot to cross a boundary of the physical volume defined by the workspace footprint;
    determining that the modified global path has been generated; and
    causing the robot to switch from following the initial modified local trajectory to following the modified global path for the robot.

2. The method of claim 1, wherein the robotics control system has a first time constraint on computing local trajectories and a second time constraint on computing modified global paths, wherein the second time constraint is larger than the first time constraint.

3. The method of claim 2, wherein the robotics control system enters a fault state if the first time constraint is violated when not computing a modified global path.

4. The method of claim 3, wherein the robotics control system enters a fault state if the second time constraint is violated when computing the modified global path.

5. The method of claim 1, wherein repeatedly following the initial modified local trajectory for the robot while generating a modified global path for the robot comprises bypassing a process for computing local trajectories from sensor observations.

6. The method of claim 1, wherein the workspace footprint is precomputed offline for the robot.

7. The method of claim 1, wherein generating the modified global path to avoid causing the robot to cross the boundary of the physical volume defined by the workspace footprint comprises generating a modified global path that causes the robot to remain within the physical volume defined by the workspace footprint.

8. The method of claim 1, wherein generating the modified global path to avoid causing the robot to cross the boundary of the physical volume defined by the workspace footprint comprises generating a modified global path that causes the robot to remain outside the physical volume defined by the workspace footprint.

9. The method of claim 1, wherein the workspace footprint is computed online in real-time for the robot.

10. The method of claim 1, wherein the modified global path extends from a point along the initial modified local trajectory.

11. A robotics control system comprising:
one or more processors; and
a non-transitory storage medium storing computer instructions operable to cause the one or more processors to perform operations comprising:
receiving, for a robot, an initial plan specifying a path and a local trajectory;
receiving an updated observation of an environment of the robot;
generating an initial modified local trajectory for the robot based on the updated observation in the environment of the robot, wherein the initial modified local trajectory extends outside of a boundary of a workspace footprint for the robot at the time that the initial modified local trajectory is generated, the workspace footprint defining a physical volume within a workcell for the robot to perform a task;
repeatedly following the initial modified local trajectory that extends outside the footprint of the robot while generating a modified global path for the robot that remains entirely within the footprint of the robot until the modified global path has been generated, wherein generating the modified global path comprises:
obtaining data representing the workspace footprint for the robot, and
generating the modified global path to avoid causing the robot to cross a boundary of the physical volume defined by the workspace footprint;
determining that the modified global path has been generated; and
causing the robot to switch from following the initial modified local trajectory to following the modified global path for the robot.

12. The robotics control system of claim 11, wherein the robotics control system has a first time constraint on computing local trajectories and a second time constraint on computing modified global paths, wherein the second time constraint is larger than the first time constraint.

13. The robotics control system of claim 12, wherein the robotics control system enters a fault state if the first time constraint is violated when not computing a modified global path.

14. The robotics control system of claim 13, wherein the robotics control system enters a fault state if the second time constraint is violated when computing the modified global path.

15. The robotics control system of claim 11, wherein repeatedly following the initial modified local trajectory for the robot while generating a modified global path for the robot comprises bypassing a process for computing local trajectories from sensor observations.

16. The robotics control system of claim 11, wherein the workspace footprint is precomputed offline for the robot.

17. The robotics control system of claim 11, wherein generating the modified global path to avoid causing the robot to cross the boundary of the physical volume defined by the workspace footprint comprises generating a modified global path that causes the robot to remain within the physical volume defined by the workspace footprint.

18. The robotics control system of claim 11, wherein generating the modified global path to avoid causing the robot to cross the boundary of the physical volume defined by the workspace footprint comprises generating a modified global path that causes the robot to remain outside the physical volume defined by the workspace footprint.

19. The robotics control system of claim 11, wherein the workspace footprint is computed online in real-time for the robot.

20. A non-transitory computer-readable storage medium comprising instructions that, when executed by one or more computers, cause the one or more computers to perform operations comprising:
receiving, for a robot, an initial plan specifying a path and a local trajectory;
receiving an updated observation of an environment of the robot;
generating an initial modified local trajectory for the robot based on the updated observation in the environment of the robot, wherein the initial modified local trajectory extends outside of a boundary of a workspace footprint for the robot at the time that the initial modified local trajectory is generated, the workspace footprint defining a physical volume within a workcell for the robot to perform a task;
repeatedly following the initial modified local trajectory that extends outside the footprint of the robot while generating a modified global path for the robot that remains entirely within the footprint of the robot until the modified global path has been generated, wherein generating the modified global path comprises:
obtaining data representing the workspace footprint for the robot, and
generating the modified global path to avoid causing the robot to cross a boundary of the physical volume defined by the workspace footprint;
determining that the modified global path has been generated; and
causing the robot to switch from following the initial modified local trajectory to following the modified global path for the robot.

* * * * *